(12) United States Patent
Hyakuda et al.

(10) Patent No.: US 7,601,779 B2
(45) Date of Patent: Oct. 13, 2009

(54) POLYMER COMPOUND AND RECORDING MEDIUM

(75) Inventors: Hirokazu Hyakuda, Kawasaki (JP); Hiroshi Kakihira, Fukui (JP)

(73) Assignee: Canon Finetech Inc., Mitsato-Shi (JP)

( * ) Notice: Subject to any disclaimer, the term of this patent is extended or adjusted under 35 U.S.C. 154(b) by 603 days.

(21) Appl. No.: 11/359,446

(22) Filed: Feb. 23, 2006

(65) Prior Publication Data

US 2006/0194943 A1 Aug. 31, 2006

(30) Foreign Application Priority Data

Feb. 25, 2005 (JP) ............................. 2005-052037
Dec. 26, 2005 (JP) ............................. 2005-372336

(51) Int. Cl.
C08J 3/00 (2006.01)
C08K 3/20 (2006.01)
C08L 75/00 (2006.01)
G01D 9/00 (2006.01)
B41M 5/00 (2006.01)
B41M 5/40 (2006.01)
B32B 27/00 (2006.01)
B32B 27/40 (2006.01)
C08G 18/00 (2006.01)
C08G 18/21 (2006.01)
C08G 18/70 (2006.01)

(52) U.S. Cl. .................. 524/591; 346/135.1; 428/32.1; 428/32.15; 428/32.26; 428/32.34; 428/32.35; 428/32.37; 428/423.1; 428/425.1; 528/44; 528/71; 528/76; 528/77; 528/85; 524/589; 524/590; 524/839; 524/840

(58) Field of Classification Search .................. 524/589, 524/590, 591, 839, 840; 428/32.1, 32.34, 428/423.1, 425.1, 32.15, 32.26, 32.35, 32.37; 528/44, 76, 77, 85, 71; 346/135.1
See application file for complete search history.

(56) References Cited

U.S. PATENT DOCUMENTS

| | | | | |
|---|---|---|---|---|
| 4,202,870 A | 5/1980 | Weber et al. | ................ | 423/630 |
| 4,242,271 A | 12/1980 | Weber et al. | .......... | 260/448 AD |
| 4,425,405 A | 1/1984 | Murakami et al. | .......... | 428/342 |
| 4,503,118 A | 3/1985 | Murakami et al. | .......... | 428/323 |
| 4,723,129 A | 2/1988 | Endo et al. | .................... | 346/1.1 |
| 4,740,796 A | 4/1988 | Endo et al. | .................... | 346/1.1 |
| 4,849,774 A | 7/1989 | Endo et al. | .............. | 346/140 R |
| 5,122,814 A | 6/1992 | Endo et al. | ................ | 346/33 R |
| 5,159,349 A | 10/1992 | Endo et al. | ................ | 346/33 A |
| 5,314,942 A * | 5/1994 | Coogan et al. | .............. | 524/457 |
| 5,521,621 A | 5/1996 | Endo et al. | .................... | 347/15 |
| 5,670,249 A | 9/1997 | Tanuma | ................... | 428/304.4 |
| 5,754,194 A | 5/1998 | Endo et al. | .................... | 347/15 |
| 2007/0273716 A1 * | 11/2007 | Kakihira et al. | ............. | 346/134 |

FOREIGN PATENT DOCUMENTS

| | | |
|---|---|---|
| JP | 54-59936 | 5/1979 |
| JP | 57-74192 A | 5/1982 |
| JP | 57-87989 A | 6/1982 |
| JP | 60-72785 A | 4/1985 |
| JP | 61-146591 A | 7/1986 |
| JP | 61-154989 A | 7/1986 |
| JP | 1-115677 A | 5/1989 |
| JP | 4-34953 B2 | 6/1992 |
| JP | 7-195824 A | 8/1995 |
| JP | 7-314883 A | 12/1995 |
| JP | 8-25796 A | 1/1996 |
| JP | 8-150773 A | 6/1996 |
| JP | 2001-71627 A | 3/2001 |
| JP | 2001-139850 A | 5/2001 |
| JP | 2001-301315 A | 10/2001 |

OTHER PUBLICATIONS

Gulari et al., "Photon correlation spectroscopy of particle distributions," J. Chem. Phys. 70(8), Apr. 15, 1979, pp. 3965-3972.
Polymer Structure (2); Scattering Experiments and Morphological Observation; the First Chapter: Light Scattering (Kyoritsu Shuppan, edited by the Society of Polymer Science, Japan), pp. 126-127.

* cited by examiner

*Primary Examiner*—Patrick D Niland
(74) *Attorney, Agent, or Firm*—Fitzpatrick, Cella, Harper & Scinto

(57) ABSTRACT

A polymer compound comprises a unit composed of a sulfur-containing compound (A) having at least two active hydrogen groups, a unit composed of a compound (B) having at least two isocyanate groups and a unit composed of an amine compound (C) having at least two active hydrogen groups, and having an average particle size of 200 nm or smaller. The polymer compound can be used in a recording medium.

5 Claims, No Drawings

POLYMER COMPOUND AND RECORDING MEDIUM

BACKGROUND OF THE INVENTION

1. Field of the Invention

The present invention relates to a polymer compound and a recording medium that can provide a recorded image free of discoloration or fading of the image caused by acid gases in the air or light and blurring of the image under a high-temperature and high-humidity environment and suitable for long-term storage when recording is conducted by means of a printer or plotter utilizing an ink-jet recording system.

2. Related Background Art

An ink-jet recording system is a system that minute droplets of an ink are applied to a recording medium such as paper by various working principles, and at the same time, a solvent component in the ink penetrates into the recording medium or evaporates, thereby precipitating a coloring material component in the ink on the recording medium to make a record of images, characters and/or the like (hereinafter referred to as "image") and has such features that recording can be conducted at high speed and with a low noise, recording patterns are very flexible, multi-color images can be formed with ease, and development and image fixing are unnecessary.

In recent years, in particular, ink-jet printers have been rapidly widespread as image-recording apparatus for various kinds of information instruments, because an image formed by a multi-color ink-jet recording system has such merits that it can have quality comparable with an image formed by multi-color printing of a plate system or a color photography system, and that it is provided at a cheaper printing cost than that by the ordinary printing or photographic technique when the number of copies is small. Accordingly, the ink-jet printers are about to be widely applied to fields of which recording of full-color images is required, for example, outputting of image designs in design industries, production of color block copies in a printing field of which photographic quality is required, billboards and trade samples that are frequently replaced, and the like. Further, with the wide spreading of personal computers and digital still cameras, there have been recently many chances of outputting photographic images using an ink-jet printer even in domestic use.

However, the image recorded by the ink-jet printer is markedly faded or discolored by acid gases in the air and light compared with the images of the multi-color printing of the plate system and the color photography, and so such an image is unsuitable for an image, of which long-term storage is required, under the circumstances. Accordingly, there has been a very strong demand for prevention of the fading and discoloration of images formed by the ink-jet printers, and many proposals for improving such performance properties have been made to date.

For example, recording media containing a thioether compound in Japanese Patent Application Laid-Open No. 1-115677, a hydrazide compound in Japanese Patent Application Laid-Open No. 61-154989, or a thiourea derivative, thiosemicarbazide derivative, thiocarbo-hydrazide derivative or the like in Japanese Patent Publication No. 4-34953 and Japanese Patent Application Laid-Open No. 7-314883 are disclosed for the purpose of improving gas fastness. A recording medium containing one selected from a thiourea derivative, a thiosemicarbazide derivative and a thiocarbohydrazide derivative and one selected from iodine, an iodide, dithiocarbamic acid, a thiocyanate and a thiocyanic ester is disclosed in Japanese Patent Application Laid-Open No. 08-25796.

On the other hand, recording media containing a phenolic antioxidant and a benzophenone or benzotriazole type ultraviolet absorbent are disclosed in Japanese Patent Application Laid-Open Nos. 57-74192, 57-87989 and 60-72785 as recording media for improving light fastness of images.

In addition, a recording medium containing a hindered amine compound and a recording medium containing a hydrazide compound have been proposed in Japanese Patent Application Laid-Open Nos. 61-146591 and 61-154989, respectively.

Further, recording media with ascorbic acid, erysorbic acid or sodium erysorbate contained in an ink-receiving layer and with a flavonoid contained in an ink-receiving layer are disclosed in Japanese Patent Application Laid-Open Nos. 7-195824 and 8-150773, and Japanese Patent Application Laid-Open Nos. 2001-71627, 2001-139850 and 2001-301315, respectively, for improving the gas fastness and light fastness of images.

However, many of the above-described compounds are water-insoluble compounds and involve a problem that they cannot be added to an aqueous coating liquid for forming an ink-receiving layer. On the other hand, water-soluble compounds among the above-described compounds tend to make an image formed on an ink-receiving layer containing such a compound easy to blur under a high-temperature and high-humidity environment. When such a compound is added in a great amount to an ink-receiving layer for imparting sufficient gas fastness and light fastness to an image formed on the ink-receiving layer, the density of the image may be lowered in some cases.

SUMMARY OF THE INVENTION

The present invention has been made with the foregoing circumstances in view and has as its object the provision of a polymer compound useful as an antioxidant and a recording medium using the polymer compound, on which an image of a high density can be formed, and which is suitable for long-term storage of the image in that the resultant image is excellent in ozone fastness and light fastness, and blurring of the image can be prevented even when the image is stored for a long period of time under a high-temperature and high-humidity environment.

The present inventors have carried out various investigations with a view toward obtaining a recording medium, on which an image of a high density can be formed, and which is excellent in storage stability of the image in that the resultant image is excellent in ozone fastness and light fastness, and blurring of the image can be prevented even when the image is stored for a long period of time under a high-temperature and high-humidity environment. As a result, it has been found that the above-described problems can be solved by the use of a recording medium obtained by adding an aqueous dispersion of a polymer compound of a specific structure having a sulfur atom in its molecular structure, which has an average particle size of 200 nm or smaller as measured by a dynamic light scattering method, to a coating liquid for forming an ink-receiving layer, and applying and drying the coating liquid, thus leading to completion of the present invention.

According to the present invention, there is thus provided a polymer compound comprising a unit composed of a sulfur-containing compound (A) having at least two active hydrogen groups, a unit composed of a compound (B) having at least two isocyanate groups and a unit composed of an amine compound (C) having at least two active hydrogen groups, and having an average particle size of 200 nm or smaller.

The polymer compound according to the present invention may preferably be such that the content of the unit of the compound (A) is 10 to 65% by mass, the content of the unit of the compound (B) is 10 to 80% by mass, and the content of the unit of the compound (C) is 3 to 80% by mass.

It may be preferable that the polymer compound according to the present invention has an amino group in its structure, at least a part of said amino group being cationized, and is in a state of an aqueous dispersion.

According to the present invention, there is also provided a recording medium comprising a support and at least one ink-receiving layer provided on at least one surface of the support, wherein the ink-receiving layer at least contains the polymer compound according to the present invention.

The content of the polymer compound in the ink-receiving layer may preferably be 0.05 to 20% by mass in terms of solid content based on the ink-receiving layer.

According to the present invention, there can be provided polymer compounds useful as an antioxidant and recording medium using such a polymer compound, on which images of a high density can be formed, and which are suitable for long-term storage of the images in that the resultant images are excellent in ozone fastness and light fastness, and blurring of the images can be prevented even when the images are stored for a long period of time under a high-temperature and high-humidity environment.

DETAILED DESCRIPTION OF THE PREFERRED EMBODIMENTS

The present invention will hereinafter be described in more detail by the preferred embodiments.

The polymer compound according to the present invention is a polymer compound comprising a unit composed of a sulfur-containing compound (A) having at least two active hydrogen groups, a unit composed of a compound (B) having at least two isocyanate groups and a unit composed of an amine compound (C) having at least two active hydrogen groups.

The polymer compound according to the present invention is obtained by reacting the compound (A), the compound (B) and the compound (C) with one another. No particular limitation is imposed on the compound (A) used in the present invention. However, a compound having at least one sulfide group in its molecule is preferred. Specifically, the compound is desirably a compound represented by any one of the following general formula (1) to (6). The following compounds (A) may be used singly or in combination of at least 2 compounds thereof at the same time to synthesize the polymer compound according to the present invention.

General formula (1)

wherein n is 1 or 2, and $R^1$ is a methylene, ethylene or propylene group.

General formula (2)

wherein n is 1 or 2, and $R^2$ and $R^3$ are, independently of each other, hydrogen, a hydroxyl group or an alkyl group and may be the same or different from each other.

General formula (3)

wherein n is 0 or 1.

General formula (4)

wherein n is 1 or 2, $R^4$ is sulfur or oxygen, and $R^5$ is sulfur or —$SO_2$—, with the proviso that $R^4$ and $R^5$ are different from each other.

General formula (5)

wherein $R^6$ and $R^7$ are, independently of each other, hydrogen or an alkyl group and may be the same or different from each other.

General formula (6)

wherein $R^8$ is a hydroxyl group or an alkyl group.

Examples of the compound (B) include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dichloro-4,4'-biphenylene diisocyanate, 1,5-naphthalene diisocyanate, 1,5-tetrahydronaphthalene diisocyanate, tetramethylene diisocyanate, 1,6-hexamethylene diisocyanate, dodecamethylene diisocyanate, trimethylhexamethylene diisocyanate, 1,3-cyclohexylene diisocyanate, 1,4-cyclohexylene diisocyanate, xylylene diisocyanate, tetramethylxylylene diisocyanate, hydrogenated xylylene diisocyanate, lysine diisocyanate, isophorone diisocyanate and 4,4'-dicyclohexylmethane diisocyanate. However, the compounds (B) are not limited thereto. These diisocyanate compounds may be used singly or in combination of at least 2 compounds thereof at the same time to synthesize the polymer compound according to the present invention.

The amine compound having at least two active hydrogen groups, which is the compound (C), is desirably a tertiary amine represented by the following general formula (7)

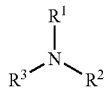

General formula (7)

wherein any one of $R^1$, $R^2$ and $R^3$ is an alkyl, alkanol or aminoalkyl group having 1 to 6 carbon atoms, and the other groups may be the same or different from each other and are, independently of each other, an alkanol, aminoalkyl or alkanethiol group.

Examples of the amine compound represented by the general formula (7) and having at least two active hydrogen groups include diol compounds such as N-methyl-N,N-diethanolamine, N-ethyl-N,N-diethanolamine, N-isobutyl-N,N-diethanolamine, N-t-butyl-N,N-diethanolamine and N-t-butyl-N,N-diisopropanolamine, triol compounds such as triethanolamine, diamine compounds such as methyliminobispropylamine and butyliminobispropylamine, and triamine compounds such as tri(2-aminoethyl)amine. These amine compounds may be used singly or in combination of at least 2 compounds thereof at the same time to synthesize the polymer compound according to the present invention.

In the polymer compound according to the present invention, it is desirable to cationize the amino group in the unit (C) in the polymer compound obtained by reacting the compound (A), the compound (B) and the compound (C) with one another.

As described above, the polymer compound according to the present invention is provided as a polymer compound comprising, in its molecule, the unit of the compound (A), the unit of the compound (B) and the unit of the compound (C) (the tertiary amino group of this unit being preferably cationized) by reacting the compound (A), the compound (B) and the compound (C) with one another. In order to sufficiently develop the function of the polymer compound, the content of the unit of the compound (C) is preferably 5.5 to 18.5% in terms of molar ratio. If the content of the unit of the compound (C) is lower than 5.5% in terms of molar ratio, the content of a hydrophilic group is lowered, so that in some cases, inconvenience may be encountered upon preparation of an aqueous dispersion of such a polymer compound, or difficulty may be encountered upon incorporation of the polymer compound into a coating liquid for forming an ink-receiving layer. If the content of the unit of the compound (C) is higher than 18.5% in terms of molar ratio on the other hand, a recording medium obtained by containing such a polymer compound may involve a problem that glossiness and image density are lowered in some cases.

When the molar ratio of the unit of the compound (C) in the polymer compound according to the present invention falls within the above range, the unit of the compound (C) may account for 3 to 80% by mass in the polymer compound. If the molar ratio is outside this range, such a polymer compound may cause the problem of lowering the dispersibility of the polymer compound in water or lowering the glossiness of an ink-receiving layer to be formed or image density in some cases.

When the content of the unit of the compound (C) in the polymer compound according to the present invention falls within the above range, the unit of the compound (A) preferably accounts for 10 to 65% by mass, more preferably 30 to 65% by mass in the polymer compound. If the content of the unit of the compound (A) is lower than 10% by mass, the effect to prevent the discoloration/fading of an image formed may become insufficient in some cases. If the content of the unit of the compound (A) exceeds 65% by mass on the other hand, the content of the hydrophilic group is relatively lowered, so that inconvenience may be encountered upon preparation of an aqueous dispersion of such a polymer compound in some cases.

The compound (B) has a function of linking the compound (A) to the compound (C), and no particular limitation is imposed on the amount used. When the content of the unit of the compound (C) falls within the above range, however, the unit of the compound (B) preferably accounts for 10 to 80% by mass, more preferably 30 to 60% by mass in the resulting polymer compound. When the content of the unit of the compound (B) falls within this range, the compound (A) and the compound (C) can be linked in sufficient amounts to fully develop the functions of the unit of the compound (A) and the unit of the compound (C).

The polymer compound may be synthesized by the so-called one-shot process that the compounds (A), (B) and (C) are reacted at a time into a random polymer, or may also be synthesized by the so-called prepolymer process that the compound (A) (or the compound (C)) is reacted with the compound (B) under isocyanate group rich conditions to prepare a prepolymer having a terminal isocyanate group, and this prepolymer is reacted with the compound (C) (or the compound (A)). In any process, a chain lengthening agent such as a low-molecular weight polyol or low-molecular weight diamine may also be used in combination. The molecular weight of the resultant polymer compound can be controlled by changing the amounts of the compounds (A), (B) and (C) used or adding a reaction terminator such as a monoalcohol or monoamine to the reaction system at proper timing.

The weight average molecular weight of the polymer compound varies according to reaction conditions, but is preferably within a range of from 1,000 to 150,000, more preferably from 2,000 to 50,000. If the weight average molecular weight of the polymer compound is lower than 1,000, the glossiness of an ink-receiving layer containing such a polymer compound and image density may be lowered in some cases. If the weight average molecular weight exceeds 150,000, the reaction time required for obtaining such a polymer compound becomes long, so as to increase production cost. Therefore, any polymer compound having a weight average molecular weight outside the above range is not preferred.

In the synthesis of the polymer compound, any other compound (hereinafter referred to as "compound (D)") having at least two active hydrogen groups than the compound (A) and compound (C) may be copolymerized as needed. As such a compound (D), polyester polyols, polyether polyols and polycarbonate polyols as described below may be used singly or in combination of at least 2 compounds thereof at the same time to synthesize the polymer compound according to the present invention.

Examples of the polyester polyols include polyesters obtained by a dehydration condensation reaction of a glycol component such as ethylene glycol, propylene glycol, 1,3-propanediol, 1,4-butanediol, 1,5-pentanediol, 3-methyl-1,5-pentanediol, 1,6-hexanediol, neopentylglycol diol, diethylene glycol, triethylene glycol, tetraethylene glycol, polyethylene glycol having a molecular weight of 300 to 1,000, dipropylene glycol, tripropylene glycol, bishydroxyethoxybenzene, 1,4-cyclohexanedimethanol, bisphenol A, bisphenol S, hydrogenated bisphenol A, hydroquinone or an alkylene oxide adduct with an acid component such as malonic acid, succinic acid, glutaric acid, adipic acid, pimelic acid, suberic acid, azelaic acid, sebacic acid, hendecanedicarboxylic acid, decanedicarboxylic acid, dodecanedicarboxylic acid, maleic anhydride, fumaric acid, 1,3-cyclopentanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyl-dicarboxylic acid, 1,2-bisphenoxyethane-p,p'-dicarboxylic acid, or an anhydride or ester-forming derivative of a dicarboxylic acid, and besides polyesters obtained by a ring-opening polymerization reaction of cyclic ester compounds such as ε-caprolactone and copolymerized polyesters thereof.

Examples of the polyether polyols include polymers obtained by using, as an initiator, a compound having at least two active hydrogen atoms, such as ethylene glycol, diethylene glycol, triethylene glycol, propylene glycol, trimethylene glycol, 1,3-butanediol, 1,4-butanediol, 1,5-pentanediol, 1,6-hexanediol, neopentylglycol, glycerol, trimethylolethane, trimethylolpropane, sorbitol, sucrose, bisphenol A, bisphenol S, hydrogenated bisphenol A, aconitic acid, trimellitic acid, hemimellitic acid, phosphoric acid, ethylenediamine, diethylenetriamine, triisopropanolamine, pyrogallol, dihydroxybenzoic acid, hydroxyphthalic acid or 1,2,3-propanetrithiol and addition-polymerizing one or at least two of monomers such as ethylene oxide, propylene oxide, butylene oxide, styrene oxide, epichlorohydrin, tetrahydrofuran and cyclohexylene in accordance with a process known per se in the art. Polymers obtained by using, as an initiator, a compound having at least two primary amino groups, such as ethylenediamine or propylenediamine and addition-polymerizing one or at least two of monomers such as ethylene oxide, propylene oxide, butylene oxide, styrene oxide, epichlorohydrin, tetrahydrofuran and cyclohexylene in accordance with a process known per se in the art may also be used as the polyols.

Examples of the polycarbonate polyols include compounds obtained by a reaction of a glycol such as 1,4-butanediol, 1,6-hexanediol or diethylene glycol with diphenylcarbonate and phosgene.

In the synthesis of the polymer compound, a tin catalyst and/or an amine catalyst is desirably used in the polyaddition reaction with isocyanates. Examples of such a tin catalyst include dibutyltin dilaurate and stannous octoate, and examples of the amine catalyst include triethylenediamine, triethylamine, tetramethyl-propanediamine, tetramethylbutanediamine and N-methylmorpholine. However, the catalysts are not limited thereto.

The synthesis of the polymer compound may also be conducted without using a solvent. However, a hydrophilic organic solvent that does not directly participate in the reaction system is generally used as a reaction solvent for the purpose of controlling the reaction of the reaction system and the viscosity of the reaction mixture. Example of such a hydrophilic organic solvent include ketones such as acetone, methyl ethyl ketone, methyl isobutyl ketone, diisobutyl ketone, organic acid esters such as methyl formate, ethyl formate, propyl formate, butyl formate, methyl acetate, ethyl acetate, propyl acetate, butyl acetate, methyl propionate, ethyl propionate and butyl propionate, and amines such as N,N-dimethylformamide, N-methylpyrrolidone. The hydrophilic organic solvent used is preferably finally removed from a reaction product (polymer compound).

Incidentally, at least a part of the tertiary amino group in the unit of the compound (C) of the polymer compound used in the present invention can be cationized with an acid or quaternizing agent before and after the polymer compound is prepared, thereby dispersing or dissolving the polymer compound in water. Since the polymer compound according to the present invention is required to be stably dispersed or dissolved with a preferable particle size in water, a method of cationizing it with an acid is preferred. As the acid used in the cationization, is preferred phosphoric acid or a monovalent acid. Examples of phosphoric acid include phosphoric acid and phosphorous acid, and examples of the monovalent acid include organic acids such as formic acid, acetic acid, propionic acid, butyric acid, glycolic acid, lactic acid, pyruvic acid and methanesulfinic acid, and inorganic acids such as hydrochloric acid and nitric acid. The reason why these acids are preferred is that when the polymer compound according to the present invention is dispersed or dissolved in water with another polyvalent acid than phosphoric acid, the resultant dispersion or solution may undergo viscosity increase. The polymer compound cationized with a hydroxy acid such as glycolic acid or lactic acid may be more preferably used, because yellowing on white portions is inhibited compared with other polymer compounds cationized with other acids when it is applied to a recording medium.

Particularly preferred compounds among the polymer compounds obtained in accordance with such a process as described above and used in the present invention are represented by the following general formula (8) to (13).

General formula (8)

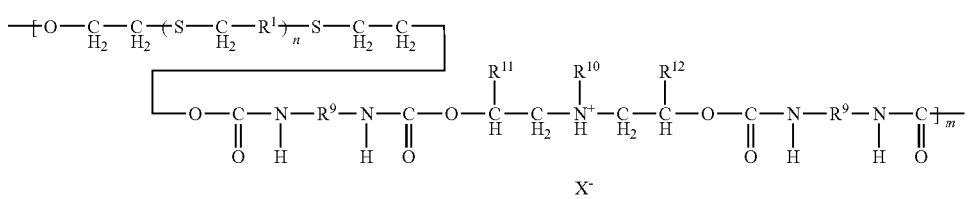

wherein n is 1 or 2, $R^1$ is a methylene, ethylene or propylene group, $R^9$ is an aliphatic hydrocarbon group containing at least one alkylene or heterocycle, $R^{10}$ is an alkyl group having 1 to 4 carbon atoms, $R^{11}$ and $R^{12}$ are, independently of each other, hydrogen or a methyl group, $X^-$ is an acidic negative ion, and m is a number with which the weight average molecular weight of the compound amounts to 1,000 to 150,000.

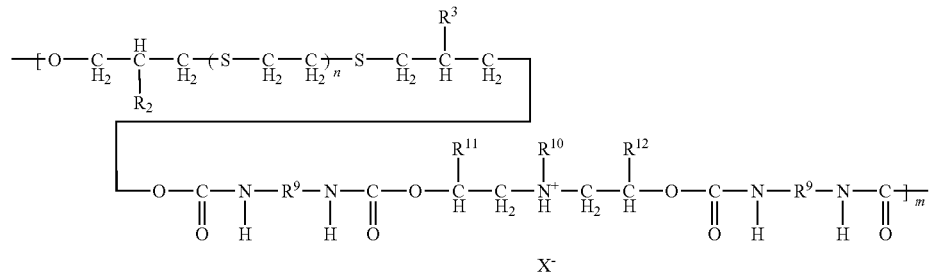

General formula (9)

wherein n is 1 or 2, $R^2$ and $R^3$ are, independently of each other, hydrogen, a hydroxyl group or an alkyl group and may be the same or different from each other, and $R^9$ to $R^{12}$, $X^-$ and m have the same meanings as defined in the general formula (8).

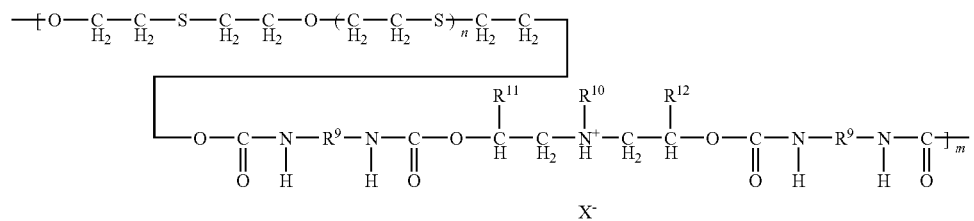

General formula (10)

wherein n is 0 or 1, and $R^9$ to $R^{12}$, $X^-$ and m have the same meanings as defined in the general formula (8).

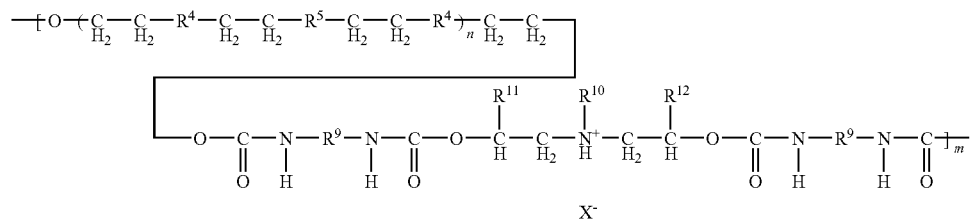

General formula (11)

wherein n is 1 or 2, $R^4$ is sulfur or oxygen, $R^5$ is sulfur or —$SO_2$—, with the proviso that $R^4$ and $R^5$ are different from each other, and $R^9$ to $R^{12}$, $X^-$ and m have the same meanings as defined in the general formula (8).

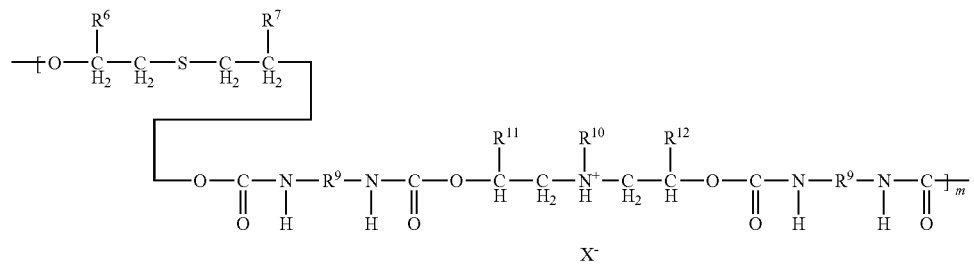

General formula (12)

wherein $R^6$ and $R^7$ are, independently of each other, hydrogen or an alkyl group and may be the same or different from each other, and $R^9$ to $R^{12}$, $X^-$ and m have the same meanings as defined in the general formula (8).

General formula (13)

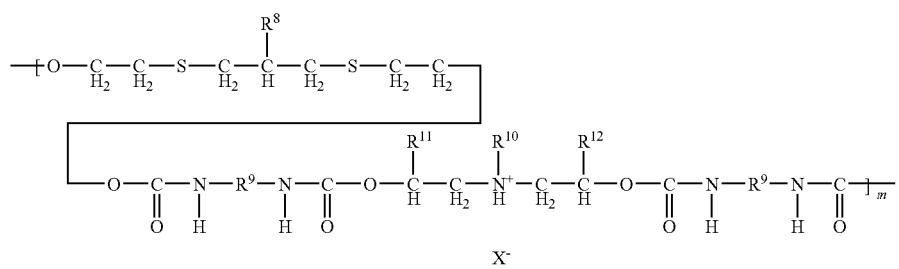

wherein $R^8$ is a hydroxyl group or an alkyl group, and $R^9$ to $R^{12}$, $X^-$ and m have the same meanings as defined in the general formula (8).

As described above, the cationized polymer compounds according to the present invention have good water-dispersibility or water-solubility. A method for dispersing the cationized polymer compound according to the present invention in water to form fine particles will hereinafter be described. The cationic group in the cationized polymer compound is dissociated in an aqueous solvent to form an electric double layer at an interface between the polymer compound and water. When fine particles of the polymer compound are present in the aqueous solvent, electrostatic repulsive force is generated among the fine particles by the action of the electric double layer, and so the fine particles of the polymer compound are stably dispersed in the solvent.

The aqueous dispersion of the cationized polymer compound according to the present invention can be prepared by any publicly known method. However, the preparation by an aqueous granulation method is more preferred in that the process is simple. More specifically, to water is added a mixture of the polymer compound and a hydrophilic organic solvent, and the resultant mixture is stirred, thereby preparing an aqueous dispersion. The hydrophilic organic solvent used herein is preferably a solvent that can be removed by azeotropic distillation or the like after the cationized polymer compound is dispersed in water. The hydrophilic solvents mentioned above may be used. It is not preferable to use a surfactant upon the preparation of the aqueous dispersion in view of adverse effects in the application of the polymer compound according to the present invention to a recording medium. No particular limitation is however imposed on the use of the surfactant.

The average particle size of the fine particles in the aqueous dispersion of the polymer compound thus obtained is about 5 nm to 1 μm, and the particle size of the fine particles can be controlled to some extent by changing conditions for the preparation of the aqueous dispersion. More specifically, the temperature, stirring conditions, concentration, ratio of the hydrophilic organic solvent to water, and the like upon the formation of the aqueous dispersion are changed, whereby the particle size of the fine particles can be controlled. The polymer compound according to the present invention may be provided as the aqueous dispersion by adding water to a reaction mixture itself after the synthesis of the polymer compound, or by removing the hydrophilic organic solvent from the reaction mixture, dissolving the polymer compound in another hydrophilic organic solvent again and using this solution.

In the aqueous dispersion of the polymer compound according to the present invention, the polymer compound may be formed into fine particles by using a dispersing machine after the polymer compound is dispersed in water. As the dispersing machine for finely pulverizing the particles of the polymer compound in such an aqueous dispersion, may be used conventionally known various dispersing machines such as high-speed rotating dispersing machines, medium-stirring type dispersing machines (for example, ball mill, sand mill and bead mill), ultrasonic dispersing machines, colloid mill dispersing machines, and high-pressure dispersing machines. However, medium-stirring type dispersing machines, colloid mill dispersing machines and high-pressure dispersing machines (homogenizers) are preferably used from the viewpoint of efficiently conducting dispersion of fine particle aggregates formed.

The polymer compound according to the present invention may be either dissolved or finely dispersed in water or an organic solvent. However, the polymer compound is more preferably dispersed in water. The average particle size of the particles dispersed is desirably within a range of from 5 nm to 200 nm. If the average particle size is smaller than 5 nm, the viscosity of the aqueous dispersion becomes high, so that it is hard to handle it. If the average particle size exceeds 200 nm on the other hand, there is a possibility that the storage stability of the aqueous dispersion of such polymer compound may be deteriorated, the glossiness of an ink-receiving layer formed when this dispersion may be used in the production of a recording medium may be lowered, or the density of an image formed on this ink-receiving layer may be lowered.

Incidentally, the average particle size in the present invention may be measured by a dynamic light scattering method and determined by analysis using a cumulant method described in "Polymer Structure (2); Scattering Experiments and Morphological Observation; the First Chapter: Light Scattering" (KYORITSU SHUPPAN, edited by the Society of Polymer Science, Japan), or J. Chem. Phys., 70(B), 15 Apl., 3965 (1979). The average particle size defined in the present invention can be easily measured by means of, for example, a laser particle size analysis system, PAR III (trade name; manufactured by OTSUKA ELECTRONICS Co., Ltd.).

The recording medium according to the present invention comprises a support and at least one ink-receiving layer provided on at least one surface of the support, wherein the ink-receiving layer at least contains the polymer compound according to the present invention. The formation of the ink-receiving layer is conducted by applying a coating liquid for forming the ink-receiving layer with a proper binder and proper inorganic fine particles dispersed or dissolved in an aqueous solvent to the surface of a proper support and drying it. In the present invention, the recording medium is obtained by a process comprising dissolving or dispersing the polymer compound in the coating liquid to form an ink-receiving layer, or by forming an ink-receiving layer with a coating liquid for forming the ink-receiving layer, which does not contain the polymer compound, and then impregnating the ink-receiving layer with the polymer compound by a proper method, for example, overcoating.

The content of the polymer compound in the ink-receiving layer is preferably 0.05 to 20% by mass in terms of solid content based on the ink-receiving layer. When the content of the polymer compound falls within this range, the fading or discoloration of an image formed on the ink-receiving layer caused by gases in the air and blurring of the image under a high-temperature and high-humidity environment can be effectively prevented. If the content of the polymer compound is lower than 0.05% by mass based on the ink-receiving layer, the fading and discoloration of the image caused by the gases and light, which are the problems to be solved in the present invention, cannot be sufficiently prevented. If the content of the polymer compound exceeds 20% by mass on the other hand, the deterioration of ink absorbency of the ink-receiving layer and lowering of image density may possibly be caused.

No particular limitation is imposed on the support of the recording medium according to the present invention, and a paper web such as wood free paper, medium-quality paper, coat paper, art paper or cast-coated paper, synthetic paper, a white plastic film, a transparent plastic films, a translucent plastic film, or resin-coated paper may be used.

When the glossiness of an image formed is effectively developed, a support high in barrier properties to the coating liquid for forming the ink-receiving layer is preferred, and a white plastic film such as polyethylene terephthalate, polyvinyl chloride, polycarbonate, polyimide, polyacetate, polyethylene, polypropylene or polystyrene, which has been opacified by blending a pigment such as titanium oxide or barium sulfate or imparting porosity, or the so-called resin-coated paper obtained by laminating a thermoplastic resin such as polyethylene or polypropylene on a base paper is preferred as the support.

When image quality and feeling comparable with a silver salt photograph are imparted to the recording medium, polyolefin resin-coated paper with at least one surface, on which the ink-receiving layer is provided, coated with a polyolefin resin may be mentioned as base paper most preferably used as the support, and polyolefin resin-coated paper, both surfaces of which are coated with the polyolefin resin, may be more preferably mentioned. A preferable formation of the polyolefin resin-coated paper is such that the average roughness at 10 points in accordance with JIS B 0601 is 0.5 µm or lower, and the 60°-specular glossiness in accordance with JIS Z 8741 is 25 to 75%. When a recording medium of a semi-gloss grade is obtained, a film or resin-coated paper, with a surface, on which the ink-receiving layer is formed, subjected to matting or embossing is preferably used.

No particular limitation is imposed on the thickness of the resin-coated paper. However, the thickness is preferably 25 to 500 µm. If the thickness of the resin-coated paper is smaller than 25 µm, the stiffness of the resulting recording medium becomes low, and such inconvenience as deterioration in feeling when the recording medium is touched with a hand or in its texture or opacity will occur. If the thickness of the resin-coated paper is greater than 500 µm on the other hand, the resultant recording medium becomes rigid and hard to handle, which may form the cause by which troubles occur upon paper feeding and conveyance in a printer. The thickness of the resin-coated paper is more preferably within a range of from 50 µm to 300 µm. No particular limitation is also imposed on the basis weight of the resin-coated paper. However, it is preferably within a range of from 25 g/m$^2$ to 500 g/m$^2$.

When paper such as wood free paper is used as the support, paper having a Stökigt sizing degree of 15 seconds or more, preferably 25 seconds or more is preferably used for achieving good coloring developing property and resolution. Besides the above, a sheet composed of glass or metal may also be used. The surface of the support may also be subjected to a corona discharge treatment or various under-coating treatments for improving adhesion strength between the support and the ink-receiving layer.

As the inorganic pigment usable in the formation of the ink-receiving layer in the present invention, are preferred fine particles high ink absorbency, excellent in coloring developing property and capable of forming a high-quality image. Examples of such an inorganic pigment include synthetic amorphous silica, colloidal silica, calcium carbonate, calcium magnesium, kaolin, clay, talc, hydrotalcite, aluminum silicate, calcium silicate, diatomaceous earth, alumina, alumina hydrate, colloidal alumina, aluminum hydroxide, aluminum hydroxide of a boehmite structure, aluminum hydroxide of a pseudoboehmite, lithopone and zeolite. These inorganic pigments may be used either singly or in any combination thereof.

The inorganic pigment preferably has an average particle size ranging from 50 nm to 500 nm, more preferably from 100 nm to 300 nm for providing an ink-receiving layer having high gloss and transparency. If the average particle size of the inorganic pigment is smaller than 50 nm, the ink absorbency of an ink-receiving layer to be formed is markedly lowered to cause bleeding and beading (a phenomenon that grain-shaped, density unevenness occurs due to failure in absorbing ink) of an ink on the ink-receiving layer when image is printed by a printer of large ejection quantities of ink. If the average particle size is greater than 500 nm on the other hand, the transparency of an ink-receiving layer to be formed is lowered, and the image density and gloss of an image may be lowered in some cases when the image is formed on the ink-receiving layer. Incidentally, the average particle size as used herein may be measured by the dynamic light scattering method and determined by the analysis using the cumulant method like the polymer compound.

Among the inorganic pigments, alumina hydrate having the boehmite structure or pseudoboehmite structure is particularly preferably used. Such an inorganic pigment can form an ink-receiving layer particularly high ink-absorbing capacity, excellent in coloring developing property and capable of forming a high-quality image.

As the inorganic pigment, is particularly preferred alumina or alumina hydrate of the boehmite structure or pseudoboehmite structure that has a BET specific surface area of 50 m$^2$/g or higher. That having a BET specific surface area ranging from 50 to 500 m$^2$/g is more preferred, with that having a BET specific surface area ranging from 50 to 250 m$^2$/g being still more preferred. An ink-receiving layer containing such alumina hydrate is excellent in ink absorbency, resistance to beading, smoothness. If the BET specific surface area of the alumina hydrate is smaller than 50 m$^2$/g, the transparency and image density of an ink-receiving layer containing such alumina hydrate are lowered, and an image formed thereon tends to become such a state as being covered with a white haze. If the BET specific surface area of the alumina hydrate exceeds 500 m²/g, a great amount of an acid is required as a deflocculant to stably disperse such alumina hydrate in water, and the ink absorbency of an ink-receiving layer containing such alumina hydrate is lowered. It is hence not preferable to use the alumina hydrate having such a too small or too large BET specific surface area.

The alumina hydrate having the boehmite structure or pseudoboehmite structure, which is preferably used in the present invention, is represented by the following general formula (14)

$$Al_2O_{3-n}(OH)_{2n} \cdot mH_2O \tag{14}$$

wherein n denotes any of 0, 1, 2 and 3, and m denotes a value falling within a range of from 0 to 10, preferably from 0 to 5. In many cases, $mH_2O$ represents a removable aqueous phase which may not participate in the formation of crystal lattice. Therefore, m may take a value other than integers. When this kind of alumina hydrate is calcined, m may reach a value of 0.

The crystal of an alumina hydrate showing the boehmite structure is generally a layer compound the (020) plane of which forms a macro-plane, and shows a characteristic diffraction peak on a X-ray diffraction pattern. Besides perfect boehmite, a structure called pseudoboehmite and containing excess water between layers of the (020) plane may be taken. The X-ray diffraction pattern of this pseudoboehmite shows a diffraction peak broader than that of the perfect boehmite. Since perfect boehmite and pseudoboehmite may not be clearly distinguished from each other, they will hereinafter be called alumina hydrate showing a boehmite structure in the present invention unless expressly noted.

No particular limitation is imposed on the production process of the alumina hydrates. For example, any method of the Bayer's method and alum pyrolytic method may be used. A particularly preferred process is a process in which an acid is added to a long-chain aluminum alkoxide to hydrolyze the alkoxides. The particle form of the alumina hydrate thus obtained may also be controlled within a specific range by controlling conditions of an aging step in which the particles are grown through a step of hydrothermal synthesis. When the aging time is properly set, primary particles of the alumina hydrate having a relatively even particle size are grown. Sols obtained herein may also be used as a dispersion as it is by adding an acid as a deflocculant. In order to improve the dispersibility of the alumina hydrate in water, however, it may be allowable to powder the sol by a method such as spray drying and then add an acid to prepare a dispersion. As the acid for deflocculating the alumina hydrate, may be used a conventionally known acid, and examples thereof include organic acids such as formic acid, acetic acid, propionic acid, butyric acid, glycolic acid, lactic acid, pyruvic acid and methanesulfinic acid, and inorganic acids such as hydrochloric acid and nitric acid. One or more acids may be freely chosen for use from among these acids.

In the present invention, a water-soluble resin and/or a water-dispersible resin may be used together with the inorganic pigment to form an ink-receiving layer. Examples of the water-soluble resin or water-dispersible resin used in the present invention include gelatin and casein and modified products thereof, cellulose derivatives such as methyl cellulose, carboxymethyl cellulose, hydroxyethyl cellulose, completely or partially saponified polyvinyl alcohol and modified products thereof (such as cationically modified products, anionically modified products and silanol-modified products) thereof, urea resins, melamine resins, epoxy resins, epichlorohydrin resins, polyurethane resins, polyethylene-imine resins, polyamide resins, polyvinyl pyrrolidone resins, polyvinyl butyral resins, poly(meth)acrylic acid and copolymers thereof, acrylamide resins, maleic anhydride copolymers, polyester resins, SBR latexes, NBR latexes, methyl methacrylate-butadiene copolymer latexes, latexes of acrylic polymers such as acrylic ester copolymers, latexes of vinyl polymers such as ethylene-vinyl acetate copolymers, and functional group-modified polymer latexes with a cationic group or anionic group added to these various polymer latexes. Among these, polyvinyl alcohol obtained by hydrolyzing polyvinyl acetate and having an average polymerization degree of 300 to 5,000 is preferred. The saponification degree thereof is preferably not lower than 70%, but lower than 100%, more preferably from 80 to 99.5%. These water-soluble or water-dispersible resins may be used either singly or in any combination thereof.

The mixing ratio of the inorganic pigment (A) to the water-soluble resin and/or the water-dispersible resin (B) is within a range of preferably from 1:1 to 30:1, more preferably from 1.5:1 to 20:1 in terms of mass ratio of (A) to (B). When the amount of the water-soluble resin and/or the water-dispersible resin falls within this range, an ink-receiving layer to be formed is hard to cause cracking and powdery coming-off and also has good ink absorbency.

In order to improve the film-forming ability, water resistance and film strength of a coating film formed by the inorganic fine particles and the water-soluble resin and/or the water-dispersible resin in the recording medium according to the present invention, a hardener may also be added into the ink-receiving layer. The hardener is generally selected from various substances according to the kind of a reactive group that a polymer used has. For example, when the polymer used is a polyvinyl alcohol resin, epoxy hardeners as well as inorganic hardeners such as boron compounds, e.g. boric acid, and water-soluble aluminum salts may be mentioned as the hardener.

The amount of the hardener used varies according to the amount of the water-soluble resin and/or the water-dispersible resin used as a binder. However, the hardener may be generally added in a proportion of 0.1 to 30% by mass based on the water-soluble resin and/or the water-dispersible resin. If the content of the hardener is lower than 0.1% by mass based on the water-soluble resin and/or the water-dispersible resin, the film-forming ability is lowered to fail to impart sufficient water resistance to the ink-receiving layer formed. If the content exceeds 30% by mass on the other hand, change of the viscosity of the coating liquid for forming the ink-receiving layer with time becomes great, and so coating stability may be lowered in some cases.

As a method for adding the hardener upon the formation of the ink-receiving layer, is considered a method in which an inorganic fine particle dispersion, a binder and the hardener are mixed at the same time, a method in which the inorganic fine particle dispersion and the binder are mixed in advance, and the hardener is mixed right before coating, a method in which the inorganic fine particle dispersion and the hardener are mixed in advance, and the binder is mixed right before coating, or a method in which the binder and the hardener are mixed in advance, and the inorganic fine particle dispersion is mixed right before coating. In any method, a coating liquid for forming the ink-receiving layer may be prepared batch-wise or continuously to form the ink-receiving layer.

As a method for adding the polymer compound to the coating liquid upon the formation of the ink-receiving layer, is considered a method in which the inorganic fine particle dispersion, the binder and the polymer compound are mixed at the same time, a method in which the inorganic fine particle dispersion and the binder are mixed in advance, and the polymer compound is mixed right before coating, a method in which the inorganic fine particle dispersion and the polymer compound are mixed in advance, and the binder is mixed right before coating, or a method in which the binder and the polymer compound are mixed in advance, and the inorganic fine particle dispersion is mixed right before coating. In any method, a coating liquid for forming the ink-receiving layer may be prepared batch-wise or continuously to form the ink-receiving layer. Besides the above, a method in which the polymer compound is applied to a support in advance before the formation of the ink-receiving layer, a method in which a coating liquid containing the polymer compound is applied to the ink-receiving layer during the formation of the ink-receiving layer or after the formation of the ink-receiving layer, or a method in which the coating liquid containing the polymer compound is applied to an upper layer or lower layer of the ink-receiving layer at the same time may also be used.

As a structure of the recording medium according to the present invention, may be selected such a structure that at least one ink-receiving layer containing the polymer compound is provided on the support, that the coating liquid containing the polymer compound is overcoated on the ink-receiving layer, or that a small amount of a coating liquid for forming the ink-receiving layer, in which the polymer compound is contained, is applied to the surface of the support to form the ink-receiving layer. In the present invention, these structures may also be included as those in which "the ink-receiving layer has been formed on the surface of the support".

No particular limitation is imposed on the solid content concentration of the coating liquid for forming the ink-receiving layer so far as it is such that the coating liquid is given a viscosity of such a degree that the ink-receiving layer can be formed on the support. However, the solid content concentration is preferably 5 to 50% by mass based on the whole mass of the coating amount for forming the ink-receiving layer. If the solid content concentration is lower than 5% by mass, the coating liquid requires to increase the coating weight for thickening the thickness of the ink-receiving layer. In this case, drying requires lots of time and energy, so that such a coating liquid may not be economical. If the solid content concentration exceeds 50% by mass on the other hand, the viscosity of the coating liquid for forming the ink-receiving layer becomes high, so that the coating ability of the coating liquid may be lowered in some cases.

Various kinds of additives may be incorporated into the coating liquid within limits not impeding the effect of the present invention. As examples of such additives, may be mentioned surfactants, pigment dispersants, thickeners, crosslinking agents, antifoaming agents, ink-fixing agents, dot adjusters, coloring materials, fluorescent whitening agents, preservatives, pH adjusters, antistatic agents and conductivity-imparting agents.

As a process for coating the support with the thus-prepared coating liquid for forming the ink-receiving layer, may be applied any conventionally known coating process. For example, coating with a coating system such as a blade coating, air-knife coating, curtain die coating, slot die coating, bar coating, gravure coating or roll coating is feasible. Thereafter, drying is conducted by means of a drying device such as a hot air dryer, heated drum dryer or far infrared dryer, whereby the ink-receiving layer can be formed. The ink-receiving layer may be formed by changing the compositional ratio of the alumina hydrate to the resin and other additives, and may also be formed on one surface or both surfaces of the support. In order to improve the resolution of an image formed on the ink-receiving layer and conveyability of the recording medium, the ink-receiving layer may also be subjected to a smoothing treatment by means of a device such as a calender or cast.

A preferable range of the coating weight of the coating liquid for forming the ink-receiving layer on the support is from 0.5 to 60 $g/m^2$ in terms of solid content, and a more preferable range of the coating weight is from 5 to 55 $g/m^2$. If the coating weight is less than 0.5 $g/m^2$, the formed ink-receiving layer cannot sufficiently absorb water in an ink, and so in some cases, the ink may run, or an image formed may blur. If the coating weight exceeds 60 $g/m^2$ on the other hand, curling may occur on the resulting recording medium upon drying, or such a marked effect as expected may not be developed on printing performance.

The reason why the fading and discoloration of the image formed on the ink-receiving layer of such a recording medium according to the present invention as described above caused by gases and light are prevented is not clearly known. It is however considered to be attributable to the result of the action of the polymer compound to inhibit the generation of radicals and peroxides in the ink-receiving layer. The reason why the blurring of the image under a high-temperature and high-humidity environment is prevented is considered to be that the hydrophilicity of the ink-receiving layer is greatly reduced by the polymerization of the hydroxyl group that the compound (A) or compound (C) making up the polymer compound has, whereby the inherent hygroscopicity of the ink-receiving layer is reduced.

No particular limitation is imposed on inks used in recording on the recording medium according to the present invention. However, general ink-jet recording water-based inks obtained by using a dye or pigment as a coloring material, using a mixture of water and a water-soluble organic solvent as a medium and dissolving or dispersing the dye or pigment in the medium are preferably used.

For a process for applying the above-describe inks to the recording medium to form an image, an ink-jet recording process is particularly preferred. As the ink-jet recording process, any process may be used so far as it is a process comprising effectively ejecting an ink from a nozzle to apply the ink to a recording medium. In particular, an ink-jet recording system described in Japanese Patent Application Laid-Open No. 54-59936, in which an ink undergoes a rapid volumetric change by an action of thermal energy applied to the ink, so that the ink is ejected from a nozzle by the working force generated by this change of state, may be used effectively.

The present invention will hereinafter be described specifically by the following Examples. Incidentally, all designations of "part" or "parts" and "%" as will be used in the following examples mean part or parts by mass and % by mass unless expressly noted.

<Preparation of Alumina Hydrate>

Aluminum dodecanoxide was prepared in accordance with the process described in U.S. Pat. No. 4,242,271. The aluminum dodecanoxide was then hydrolyzed in accordance with the process described in U.S. Pat. No. 4,202,870 to prepare an alumina slurry. Water was added to the alumina slurry until the solid content of alumina hydrate having a boehmite structure reached 7.7%. The pH of the alumina slurry was 9.4. A 3.9% nitric acid solution was added to this slurry to adjust the pH thereof.

The slurry was then aged by means of an autoclave under the conditions that the pH before aging was 6.0, an aging temperature was 150° C., and an aging time was 6 hours, thereby obtaining a colloidal sol. This colloidal sol was spray-dried at an inlet temperature of 87° C. to prepare alumina hydrate powder. The resultant powder was alumina hydrate whose particle shape was a tabular form and whose crystal structure was a boehmite structure. The alumina hydrate having the boehmite structure was mixed with ion-exchanged water in such a manner that the solid content amounts to 20%, thereby preparing an alumina hydrate dispersion.

The dispersion obtained by the above-described process was redispersed by means of a ultrasonic homogenizer (UH-600S, trade name; product of SMT Co., Ltd.) to prepare an alumina hydrate dispersion having a solid content of 20%. The average particle size of the thus-obtained alumina hydrate dispersion was measured by means of a laser particle size analysis system, PAR III (trade name; manufactured by OTSUKA ELECTRONICS Co., Ltd.). As a result, the average particle size was found to be 165.5 nm.

SYNTHESIS EXAMPLE 1 OF POLYMER COMPOUND

Aqueous dispersions 1 to 6 of a polymer compound were synthesized in the following manner.

After a reaction vessel equipped with a stirrer, a thermometer and a reflux condenser was charged with 109 g of acetone as a reaction solvent, and 40.00 g of 3,6-dithia-1,8-octanediol and 6.79 g of methyldiethanolamine were dissolved under stirring, the resultant solution was heated to 40° C., and 62.07 g of isophorone diisocyanate was added. Thereafter, the resultant mixture was heated to 50° C., 0.2 g of a tin catalyst was added, and the mixture was heated further to 55° C. to conduct a reaction for 4 hours with stirring, thereby synthesizing a polymer compound.

After completion of the reaction, the reaction mixture was cooled to room temperature, and 3.09 g of 85% formic acid was added to cationize the polymer compound. After 446 g of water was additionally added, the resultant mixture was concentrated under reduced pressure to remove acetone, and the concentration of the mixture was adjusted with water, thereby preparing Aqueous Dispersion 1 of the polymer compound having a solid content of 20%. Stirring conditions of the reaction mixture were changed upon the addition of water, thereby also preparing Aqueous Dispersions 2 to 6 of the polymer compound, which were different in particle size from one another. The average particle sizes of the thus-obtained Aqueous Dispersions 1 to 6 were measured by means of the laser particle size analysis system, PAR III (trade name; manufactured by OTSUKA ELECTRONICS Co., Ltd.). The measured results are shown in Table 3.

SYNTHESIS EXAMPLE 2 OF POLYMER COMPOUND

Aqueous dispersions 7 to 10 of a polymer compound were prepared in the following manner.

After a reaction vessel equipped with a stirrer, a thermometer and a reflux condenser was charged with 81 g of acetone as a reaction solvent, and 30.00 g of 3,6-dithia-1,8-octanediol and 6.98 g of t-butyldiethanolamine were dissolved under stirring, the resultant solution was heated to 40° C., and 44.28 g of isophorone diisocyanate was added. Thereafter, the resultant mixture was heated to 50° C., 0.4 g of a tin catalyst was added, and the mixture was heated further to 55° C. to conduct a reaction for 5 hours with stirring, thereby synthesizing a polymer compound.

After completion of the reaction, the reaction mixture was cooled to room temperature, and 4.51 g of 35% hydrochloric acid was added to cationize the polymer compound. After 331 g of water was additionally added, the resultant mixture was concentrated under reduced pressure to remove acetone, and the concentration of the mixture was adjusted with water, thereby preparing Aqueous Dispersion 7 of the polymer compound having a solid content of 20%. Stirring conditions of the reaction mixture were changed upon the addition of water, thereby also preparing Aqueous Dispersions 8 to 10 of the polymer compound, which were different in particle size from one another. The average particle sizes of the thus-obtained Aqueous Dispersions 7 to 10 were measured in the same manner as in Synthesis Example 1. The measured results are shown in Table 3.

SYNTHESIS EXAMPLE 3 OF POLYMER COMPOUND

Aqueous dispersions 11 to 14 of a polymer compound were synthesized in the following manner.

After a reaction vessel equipped with a stirrer, a thermometer and a reflux condenser was charged with 258 g of acetone as a reaction solvent, and 40.00 g of 5-hydroxy-3,7-dithia-1,9-nonanediol and 6.29 g of methyldiethanolamine were dissolved under stirring, the resultant solution was heated to 40° C., and 54.17 g of isophorone diisocyanate was added. Thereafter, the resultant mixture was heated to 50° C., 0.1 g of a tin catalyst was added, and the mixture was heated further to 55° C. to conduct a reaction for 2 hours with stirring, thereby synthesizing a polymer compound.

After completion of the reaction, the reaction mixture was cooled to room temperature, and 2.86 g of 85% formic acid was added to cationize the polymer compound. After 412 g of water was additionally added, the resultant mixture was concentrated under reduced pressure to remove acetone, thereby preparing Aqueous Dispersion 11 of the polymer compound having a solid content of 20%. Stirring conditions of the reaction mixture were changed upon the addition of water, thereby also preparing Aqueous Dispersions 12 to 14 of the polymer compound, which were different in particle size from one another. The average particle sizes of the thus-obtained Aqueous Dispersions 11 to 14 were measured in the same manner as in Synthesis Example 1. The measured results are shown in Table 3.

Components for the syntheses of the aqueous dispersions of the polymer compounds and their contents are shown in Table 1. The weight average molecular weights (Mw) and molecular weight distributions (Mw/Mn) of the polymer compounds as measured by means of GPC (gel permeation chromatography; controller: SC8010, detector: RI8012, products of TOSOH CORPORATION) are shown in Table 2. It was confirmed that a C=O stretching vibration at 1,730 to 1,690 $cm^{-1}$, an N—H deformation vibration around 1,540 $cm^{-1}$ and an N—H stretching vibration around 3,450 to 3,300 $cm^{-1}$, which were absorptions characteristic of an urethane group, were found by FT/IR 5300 (manufactured by JASCO Co., Ltd.), whereby polymerization took place in all the reactions to polymerize the raw material components.

TABLE 1

List of polymer compounds synthesized

| Aqueous dispersion of polymer compound | Compound (A) | | Compound (B) | | Compound (C) | |
|---|---|---|---|---|---|---|
| | Name of compound | Content (%) | Name of compound | Content (%) | Name of compound | Content (%) |
| 1 to 6 | 3, 6-Dithia-1,8-octanediol | 36.7 | Isophorone diisocyanate | 57.0 | Methyl-diethanolamine | 6.3 |
| 7 to 10 | 3,6-Dithia-1,8-octanediol | 36.9 | Isophorone diisocyanate | 54.5 | t-Buthyl-diethanolamine | 8.6 |
| 11 to 14 | 5-Hydroxy-3,7-dithia-1,9-nonanediol | 39.8 | Isophorone diisocyanate | 53.9 | Methyl-diethanolamine | 6.3 |

TABLE 2

Molecular weights of polymer compounds

| Aqueous dispersion of polymer compound | Weight average molecular weight (Mw) | Molecular weight distribution (Mw/Mn) |
|---|---|---|
| 1 to 6 | 15,100 | 1.90 |
| 7 to 10 | 17,200 | 1.99 |
| 11 to 14 | 15,400 | 2.11 |

TABLE 3

Average particle sizes of aqueous dispersions of polymer compounds

| Aqueous dispersion of polymer compound | Average particle size (nm) |
|---|---|
| 1 | 14 |
| 2 | 31 |
| 3 | 58 |
| 4 | 106 |
| 5 | 175 |
| 6 | 269 |
| 7 | 27 |
| 8 | 112 |
| 9 | 191 |
| 10 | 272 |
| 11 | 11 |
| 12 | 133 |
| 13 | 186 |
| 14 | 295 |

<Evaluation 1: Evaluation Method as to Storage Stability of Aqueous Dispersion of Polymer Compound>

Each of the above-prepared Aqueous Dispersions 1 to 14 of the polymer compounds was placed in a 100-ml glass bottle and left stationarily for 3 months at ordinary temperature to visually evaluate it as to whether precipitate occurred or not. The aqueous dispersions were ranked as "A" where no precipitate was observed, "B" where precipitate was slightly observed, but redispersed when it was shaken up, or "C" where precipitate was observed and not redispersed even when it was shaken up. The results are shown in Table 4-1.

TABLE 4-1

Results of Evaluation 1

| Aqueous dispersion of polymer compound | Storage stability |
|---|---|
| 1 | A |
| 2 | A |
| 3 | A |
| 4 | B |
| 5 | B |
| 6 | C |
| 7 | A |
| 8 | B |
| 9 | B |
| 10 | C |
| 11 | A |
| 12 | B |
| 13 | B |
| 14 | C |

EXAMPLE 1

To 100 parts of the above-prepared alumina hydrate dispersion, were added 0.4 part (2% based on the alumina hydrate) of boric acid and 2.0 parts (10% based on the alumina hydrate), in terms of a solid content, of Aqueous Dispersion 1 of the polymer compound having a solid content of 20%, and 2 parts (10% based on the alumina hydrate), in terms of a solid content, of a 5% aqueous solution of polyvinyl alcohol (PVA 245, trade name; product of Kuraray Co., Ltd.) was further added. The resultant mixture was uniformly stirred by a three-one motor. Thereafter, polyethylene-coated paper (product of Oji Paper Co., Ltd.; thickness: 224 μm, basis weight: 234 g/m$^2$; 60°-specular glossiness: 64% as measured in accordance with JIS Z 8741; custom-made product) was used as a support, and the previously prepared coating liquid for forming an ink-receiving layer was applied on to the paper by a Meyer Bar so as to give a dry coating weight of 35 g/m$^2$, followed by drying for 20 minutes at 110° C. by a dryer to produce a recording medium according to the present invention. The recording medium was subjected to the following Evaluation 2, Evaluation 3, Evaluation 4 and Evaluation 5. The results are shown in Tables 4-2 and 4-3.

EXAMPLE 2

A recording medium according to the present invention was produced in the same manner as in EXAMPLE 1 except that Aqueous Dispersion 1 of the polymer compound in EXAMPLE 1 was changed to Aqueous Dispersion 2 of the polymer compound, and the recording medium was subjected to the following Evaluation 2, Evaluation 3, Evaluation 4 and Evaluation 5. The results are shown in Tables 4-2 and 4-3.

EXAMPLE 3

A recording medium according to the present invention was produced in the same manner as in EXAMPLE 1 except that Aqueous Dispersion 1 of the polymer compound in EXAMPLE 1 was changed to Aqueous Dispersion 3 of the polymer compound, and the recording medium was subjected to the following Evaluation 2, Evaluation 3, Evaluation 4 and Evaluation 5. The results are shown in Tables 4-2 and 4-3.

EXAMPLE 4

A recording medium according to the present invention was produced in the same manner as in EXAMPLE 1 except that Aqueous Dispersion 1 of the polymer compound in EXAMPLE 1 was changed to Aqueous Dispersion 4 of the polymer compound, and the recording medium was subjected to the following Evaluation 2, Evaluation 3, Evaluation 4 and Evaluation 5. The results are shown in Tables 4-2 and 4-3.

EXAMPLE 5

A recording medium according to the present invention was produced in the same manner as in EXAMPLE 1 except that Aqueous Dispersion 1 of the polymer compound in EXAMPLE 1 was changed to Aqueous Dispersion 5 of the polymer compound, and the recording medium was subjected to the following Evaluation 2, Evaluation 3, Evaluation 4 and Evaluation 5. The results are shown in Tables 4-2 and 4-3.

EXAMPLE 6

A recording medium according to the present invention was produced in the same manner as in EXAMPLE 1 except that Aqueous Dispersion 1 of the polymer compound in EXAMPLE 1 was changed to Aqueous Dispersion 7 of the polymer compound, and the recording medium was subjected to the following Evaluation 2, Evaluation 3, Evaluation 4 and Evaluation 5. The results are shown in Tables 4-2 and 4-3.

EXAMPLE 7

A recording medium according to the present invention was produced in the same manner as in EXAMPLE 1 except that Aqueous Dispersion 1 of the polymer compound in EXAMPLE 1 was changed to Aqueous Dispersion 8 of the polymer compound, and the recording medium was subjected to the following Evaluation 2, Evaluation 3, Evaluation 4 and Evaluation 5. The results are shown in Tables 4-2 and 4-3.

EXAMPLE 8

A recording medium according to the present invention was produced in the same manner as in EXAMPLE 1 except that Aqueous Dispersion 1 of the polymer compound in EXAMPLE 1 was changed to Aqueous Dispersion 9 of the polymer compound, and the recording medium was subjected to the following Evaluation 2, Evaluation 3, Evaluation 4 and Evaluation 5. The results are shown in Tables 4-2 and 4-3.

EXAMPLE 9

A recording medium according to the present invention was produced in the same manner as in EXAMPLE 1 except that Aqueous Dispersion 1 of the polymer compound in EXAMPLE 1 was changed to Aqueous Dispersion 11 of the polymer compound, and the recording medium was subjected to the following Evaluation 2, Evaluation 3, Evaluation: 4 and Evaluation 5. The results are shown in Tables 4-2 and 4-3.

EXAMPLE 10

A recording medium according to the present invention was produced in the same manner as in EXAMPLE 1 except that Aqueous Dispersion 1 of the polymer compound in EXAMPLE 1 was changed to Aqueous Dispersion 12 of the polymer compound, and the recording medium was subjected to the following Evaluation 2, Evaluation 3, Evaluation 4 and Evaluation 5. The results are shown in Tables 4-2 and 4-3.

EXAMPLE 11

A recording medium according to the present invention was produced in the same manner as in EXAMPLE 1 except that Aqueous Dispersion 1 of the polymer compound in EXAMPLE 1 was changed to Aqueous Dispersion 13 of the polymer compound, and the recording medium was subjected to the following Evaluation 2, Evaluation 3, Evaluation 4 and Evaluation 5. The results are shown in Tables 4-2 and 4-3.

COMPARATIVE EXAMPLE 1

A recording medium according to the present invention was produced in the same manner as in EXAMPLE 1 except that Aqueous Dispersion 1 of the polymer compound in EXAMPLE 1 was not added, and the recording medium was subjected to the following Evaluation 2, Evaluation 3, Evaluation 4 and Evaluation 5. The results are shown in Tables 4-2 and 4-3.

COMPARATIVE EXAMPLE 2

A recording medium according to the present invention was produced in the same manner as in EXAMPLE 1 except that 0.8 part (4% based on the alumina hydrate) of 3,6-dithia-1,8-octanediol was added in place of Aqueous Dispersion 1 of the polymer compound in EXAMPLE 1, and the recording medium was subjected to the following Evaluation 2, Evaluation 3, Evaluation 4 and Evaluation 5. The results are shown in Tables 4-2 and 4-3.

COMPARATIVE EXAMPLE 3

A recording medium according to the present invention was produced in the same manner as in EXAMPLE 1 except that 0.8 part (4% based on the alumina hydrate) of 5-hydroxy-3,7-dithia-1,9-nonanediol was added in place of Aqueous Dispersion 1 of the polymer compound in EXAMPLE 1, and the recording medium was subjected to the following Evaluation 2, Evaluation 3, Evaluation 4 and Evaluation 5. The results are shown in Tables 4-2 and 4-3.

COMPARATIVE EXAMPLE 4

A recording medium according to the present invention was produced in the same manner as in EXAMPLE 1 except that Aqueous Dispersion 1 of the polymer compound in EXAMPLE 1 was changed to Aqueous Dispersion 6 of the polymer compound, and the recording medium was subjected to the following Evaluation 2, Evaluation 3, Evaluation 4 and Evaluation 5. The results are shown in Tables 4-2 and 4-3.

COMPARATIVE EXAMPLE 5

A recording medium according to the present invention was produced in the same manner as in EXAMPLE 1 except that Aqueous Dispersion 1 of the polymer compound in EXAMPLE 1 was changed to Aqueous Dispersion 10 of the polymer compound, and the recording medium was subjected to the following Evaluation 2, Evaluation 3, Evaluation 4 and Evaluation 5. The results are shown in Tables 4-2 and 4-3.

COMPARATIVE EXAMPLE 6

A recording medium according to the present invention was produced in the same manner as in EXAMPLE 1 except that Aqueous Dispersion 1 of the polymer compound in EXAMPLE 1 was changed to Aqueous Dispersion 14 of the polymer compound, and the recording medium was subjected to the following Evaluation 2, Evaluation 3, Evaluation 4 and Evaluation 5. The results are shown in Tables 4-2 and 4-3.

<Evaluation 2: Evaluation Method as to Image Density>

Solid printing was conducted on each of the above-produced recording medium with each of a black (Bk) ink, a cyan (C) ink, a magenta (M) ink and a yellow (Y) ink and at an ink quantity of 100% by means of an ink-jet recording apparatus (BJ F870, trade name; manufactured by Canon Inc.), and an optical density of each color was measured by means of an optical reflection densitometer (RD-918, trade name; manufactured by Gretag Macbeth Co.).

<Evaluation 3: Evaluation Method as to the Effect to Inhibit Fading and Discoloration Caused by Gas>

The recording medium were evaluated as to the inhibitory effect on the fading and discoloration caused by exposure to ozone by setting the recording medium, on which solid printing had been conducted with each of the black (Bk) ink and the cyan (C) ink and at an ink quantity of 100% by means of the ink-jet recording apparatus (BJ F870, trade name; manufactured by Canon Inc.), in an ozone exposure tester (manufactured by SUGA TEST INSTRUMENTS CO., LTD.) and exposing them to ozone at a concentration of 1 ppm for 4 hours under conditions of 40° C. and 55% RH to measure optical densities of Bk and C by means of the optical reflection densitometer (RD-918, trade name; manufactured by Gretag Macbeth Co.), thereby calculating out the percent retention of the optical density (OD) in accordance with the following equation (1).

Percent retention of $OD = (OD$ after the test$/OD$ before the test$) \times 100 (\%)$ <Evaluation 4: Evaluation Method as to the Effect to Inhibit Fading and Discoloration Caused by Light>

The recording medium were evaluated as to the inhibitory effect on the fading and discoloration caused by light by setting the recording medium, on which solid printing had been conducted with the magenta (M) ink alone and at an ink quantity of 100% by means of the ink-jet recording apparatus (BJ F870, trade name; manufactured by Canon Inc.), in an Atlas fadeometer (conditions; intensity of irradiation at a wavelength of 340 nm: 0.39 W/m$^2$, temperature: 45° C., humidity: 70%) to measure the optical density of M by means of the optical reflection densitometer (RD-918, trade name; manufactured by Gretag Macbeth Co.) after 100 hours, thereby calculating out a percent retention of the optical density (OD) in accordance with the equation (1).

<Evaluation 5: Evaluation Method as to Image Blurring Under High Humidity>

The recording medium, on which solid printing (ink quantity: 100%) had been conducted with each of the black (Bk) ink, cyan (C) ink, magenta (M) ink and yellow (Y) ink by means of the ink-jet recording apparatus (BJ F870, trade name; manufactured by Canon Inc.), were exposed to an environment of 30° C. and 80% RH for a week to visually rank the degree of blurring of the images. The recording medium were ranked as "A" where no blurring occurred in each color, "B" where blurring slightly occurred in any color, or "C" where blurring greatly occurred in any color.

TABLE 4-2

Examples and evaluation results

| | Amount of polymer compound added to alumina hydrate (%) | Evaluation 2 Optical density | | | |
|---|---|---|---|---|---|
| | | C | M | Y | Bk |
| EX. 1 | 10 | 2.57 | 2.27 | 2.19 | 2.25 |
| EX. 2 | 10 | 2.55 | 2.25 | 2.20 | 2.25 |
| EX. 3 | 10 | 2.56 | 2.23 | 2.18 | 2.26 |
| EX. 4 | 10 | 2.49 | 2.15 | 2.15 | 2.17 |
| EX. 5 | 10 | 2.50 | 2.15 | 2.17 | 2.17 |
| EX. 6 | 10 | 2.59 | 2.26 | 2.21 | 2.27 |
| EX. 7 | 10 | 2.50 | 2.16 | 2.17 | 2.19 |
| EX. 8 | 10 | 2.49 | 2.17 | 2.15 | 2.17 |
| EX. 9 | 10 | 2.54 | 2.25 | 2.18 | 2.24 |
| EX. 10 | 10 | 2.54 | 2.26 | 2.19 | 2.25 |
| EX. 11 | 10 | 2.51 | 2.13 | 2.17 | 2.20 |
| COMP. EX. 1 | 0 | 2.49 | 2.20 | 2.11 | 2.12 |
| COMP. EX. 2 | 4 | 2.42 | 2.16 | 2.05 | 1.97 |
| COMP. EX. 3 | 4 | 2.35 | 2.04 | 1.83 | 1.87 |
| COMP. EX. 4 | 10 | 2.44 | 2.14 | 2.10 | 2.10 |
| COMP. EX. 5 | 10 | 2.43 | 2.11 | 2.04 | 2.07 |
| COMP. EX. 6 | 10 | 2.43 | 2.12 | 2.06 | 2.09 |

TABLE 4-3

Examples and evaluation results

| | Evaluation 3 Ozone fastness Percent retention of OD (%) (1 ppm, 4 hr) | | Evaluation 4 Light fastness Percent retention of OD (%) (xenon, 100 hr) | Evaluation 5 Migration 30° C., 80% HR, 1 week |
|---|---|---|---|---|
| | C | Bk | M | |
| EX. 1 | 97 | 82 | 91 | A |
| EX. 2 | 95 | 86 | 90 | A |
| EX. 3 | 99 | 86 | 92 | A |
| EX. 4 | 95 | 84 | 92 | A |
| EX. 5 | 95 | 87 | 92 | A |
| EX. 6 | 97 | 85 | 93 | A |
| EX. 7 | 96 | 87 | 92 | A |
| EX. 8 | 95 | 85 | 91 | A |
| EX. 9 | 96 | 86 | 91 | A |
| EX. 10 | 96 | 84 | 93 | A |
| EX. 11 | 98 | 86 | 92 | A |
| COMP. EX. 1 | 81 | 40 | 70 | B |
| COMP. EX. 2 | 98 | 80 | 80 | C |
| COMP. EX. 3 | 66 | 81 | 75 | C |
| COMP. EX. 4 | 98 | 82 | 91 | A |

TABLE 4-3-continued

Examples and evaluation results

| | Evaluation 3 Ozone fastness Percent retention of OD (%) (1 ppm, 4 hr) | | Evaluation 4 Light fastness Percent retention of OD (%) (xenon, 100 hr) | Evaluation 5 Migration 30° C., 80% HR, |
|---|---|---|---|---|
| | C | Bk | M | 1 week |
| EX. 4 | | | | |
| COMP. EX. 5 | 99 | 80 | 93 | A |
| COMP. EX. 6 | 99 | 86 | 93 | A |

From the results shown above, Aqueous Dispersions 1 to 5, 7 to 9 and 11 to 13 of the polymer compounds according to the present invention were excellent in storage stability, but Aqueous Dispersions 6, 10 and 14 of the polymer compounds were difficult to use after they were left stationarily for 3 months and involved a problem on storage stability.

The recording medium according to the present invention were improved in gas fastness and light fastness compared with COMPARATIVE EXAMPLE 1, in which no polymer compound according to the present invention was added, and COMPARATIVE EXAMPLES 2 and 3, in which a compound not polymerized was added, and could prevent the blurring of the images under the high-temperature and high-humidity environment.

In the recording medium of EXAMPLES 1 to 11 according to the present invention, images high in both image density and image density could be obtained without impairing the ozone fastness and light fastness compared with COMPARATIVE EXAMPLES 4 to 6. As described above, it has been achieved to provide recording medium, on which an image of a high density can be formed, and which is suitable for long-term storage of the image in that the resultant image is excellent in ozone fastness and light fastness, and blurring of the image can be prevented even when the image is stored for a long period of time under a high-temperature and high-humidity environment.

According to the present invention, there can be provided polymer compounds useful as an antioxidant and recording medium using such a polymer compound, on which an image of a high density can be formed, and which is suitable for long-term storage of the image in that the resultant image is excellent in ozone fastness and light fastness, and blurring of the image can be prevented even when the image is stored for a long period of time under a high-temperature and high-humidity environment.

While the invention has been described with reference to the preferred embodiments disclosed herein, it is not confined to the details set forth and this application is intended to cover such modifications or changes as may come within the purpose of the improvements or the scope of the appended claims.

This application claims priority benefits of Japanese Patent Applications No. 2005-052037 filed Feb. 25, 2005 and No. 2005-372336 filed Dec. 26, 2005, the entire disclosures of which are incorporated herein by reference in their entirety.

What is claimed is:

1. A polymer compound comprising a unit composed of a sulfur-containing compound (A) having at least two active hydrogen groups, a unit composed of a compound (B) having at least two isocyanate groups and a unit composed of an amine compound (C) having at least two active hydrogen groups, said polymer compound having an average particle size of from 5 nm to 200 as determined by a cumulant method and having an amino group in its structure, at least a part of the amino group being cationized, wherein the sulfur-containing compound (A) is represented by a general formula selected from the group consisting of the following general formulas (1) to (6), General formula (1)

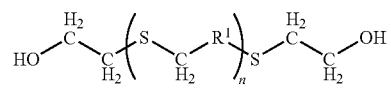

wherein n is 1 or 2, and $R^1$ is a methylene, ethylene or propylene group,

General formula (2)

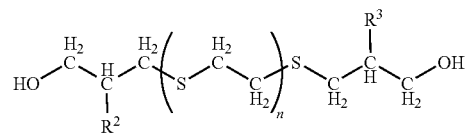

wherein n is 1 or 2, and $R^2$ and $R^3$ are, independent of each other, hydrogen, a hydroxyl group or an alkyl group and may be the same or different from each other, General formula (3)

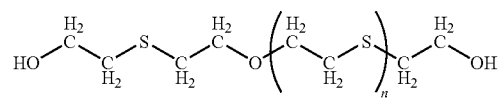

wherein n is 0 or 1,

General formula (4)

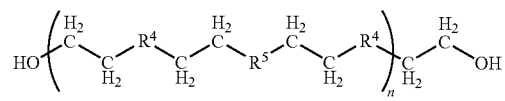

wherein n is 1 or 2, $R^4$ is sulfur or oxygen, and $R^5$ is sulfur or —$SO_2$, with the proviso that $R^4$ and $R^5$ are different from each other, General formula (5)

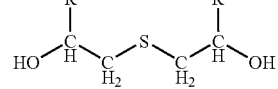

wherein $R^6$ and $R^7$ are, independently of each other, hydrogen or an alkyl group and may be the same or different from each other, and General formula (6)

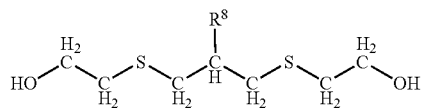

wherein $R^8$ is a hydroxyl group or an alkyl group.

2. The polymer compound according to claim 1, wherein the content of the unit of the compound (A) is 10 to 65% by mass, the content of the unit of the compound (B) is 10 to 80% by mass, and the content of the unit of the compound (C) is 3 to 80% by mass.

3. The polymer compound according to claim 1, which is in a state of an aqueous dispersion.

4. A recording medium comprising a support and at least one ink-receiving layer provided on at least one surface of the support, wherein the ink-receiving layer at least contains the polymer compound according to claim 1.

5. The recording medium according to claim 4, wherein the content of the polymer compound in the ink-receiving layer is 0.05 to 20% by mass in terms of solid content based on the ink-receiving layer.

* * * * *